United States Patent

Baron et al.

[11] Patent Number: 5,961,157
[45] Date of Patent: Oct. 5, 1999

[54] DEVICE FORMING A LEAK-PROOF CONNECTION BETWEEN A RIGID TUBE END AND A FLEXIBLE PIPE, AND METHOD FOR MAKING SAME

[75] Inventors: Daniel Baron, Fontenay-sur-Eure; Michel Brachet, Chartres, both of France

[73] Assignee: Manuli Auto France, France

[21] Appl. No.: 09/000,012

[22] PCT Filed: Jul. 23, 1996

[86] PCT No.: PCT/FR96/01161

§ 371 Date: Jan. 15, 1998

§ 102(e) Date: Jan. 15, 1998

[87] PCT Pub. No.: WO97/04266

PCT Pub. Date: Feb. 6, 1997

[30] Foreign Application Priority Data

Jul. 24, 1995 [FR] France .................................. 95 08937

[51] Int. Cl.⁶ .................................................. F16L 33/207
[52] U.S. Cl. ........................... 285/256; 285/903; 29/516; 29/890.144
[58] Field of Search .................................. 285/256, 259, 285/903; 29/516, 890.14

[56] References Cited

U.S. PATENT DOCUMENTS

| 2,024,507 | 12/1935 | Brunner . |
|---|---|---|
| 2,250,286 | 7/1941 | White . |
| 2,319,586 | 5/1943 | Clench ..................................... 285/256 |
| 2,401,921 | 6/1946 | Fisher et al. . |
| 2,485,976 | 10/1949 | Main . |
| 2,517,669 | 8/1950 | Hufferd et al. ........................... 285/256 |
| 2,584,948 | 2/1952 | Weatherhead ....................... 285/256 X |
| 3,442,537 | 5/1969 | Courtot et al. ...................... 285/256 X |
| 3,690,703 | 9/1972 | Phillipps . |
| 5,096,231 | 3/1992 | Chisnell et al. . |
| 5,417,461 | 5/1995 | Dougherty et al. . |

FOREIGN PATENT DOCUMENTS 2 737 276   10/1997   France .

*Primary Examiner*—Dave W. Arola
*Attorney, Agent, or Firm*—Larson & Taylor

[57] ABSTRACT

A device and a method for making a device for forming a leak-proof connection between a rigid tube end and the tip of a flexible pipe by crimping a metal sleeve portion onto the tip. The rigid tube end includes an end portion comprising a shoulder with a larger diameter than the tube. The device comprises a rigid insert having a cylindrical bore between both ends thereof and including on one side a tubular portion force-fitted into the tip of the pipe opposite the crimped part of the metal sleeve portion, and on the other side a portion provided with an outer flange having a matching shape and engaging the internal portion of the shoulder.

12 Claims, 2 Drawing Sheets

DEVICE FORMING A LEAK-PROOF CONNECTION BETWEEN A RIGID TUBE END AND A FLEXIBLE PIPE, AND METHOD FOR MAKING SAME

The present invention relates to a device forming a leaktight connection between a rigid tube end-piece and the end of a supple, flexible pipe by crimping a part in the form of a metal sleeve onto the end of the pipe.

It also relates to a method for making such a leaktight connection device.

It finds a particularly important although not exclusive application in the field of connections in cooling circuits, air-conditioning circuits and/or power-assisted steering systems in motor vehicles.

Devices for the leaktight connection between a rigid tube end-piece and a flexible elastomer pipe, for example made of rubber, are already known.

The rigid tube end-piece is generally force-fitted directly onto the flexible pipe around which a metal sleeve is crimped.

An assembly of this kind does, however, require a number of different operations, including an operation of longitudinally pushing the flexible pipe onto the previously machined end-piece, and a radial crimping operation.

To simplify these operations, U.S. Pat. No. 5,417,461 proposes that the end of the pipe be fitted directly in abutment in the end-piece, an insert equipped with an end collar with a seal having previously been assembled on the pipe, the collar and the pipe being crimped simultaneously into the end-piece in a single operation.

Although the assembly of a device of this kind is thus made easier, this is achieved at the cost of the ability to withstand vibration.

Devices including end-pieces with welded inserts are also known (U.S. Pat. Nos. 3,479,713; 5,370,425), and although these give a better seal and have improved resistance to vibration, they are complicated to use, especially because of the welding.

In general, the known devices have drawbacks.

They do not always guarantee a good seal especially when used with certain refrigerants, for example such as the liquid known by the reference 134a+PAG oil.

Furthermore, motor manufacturers are constantly raising their requirements regarding the resistance to wear and to the arduous environmental conditions of the connection devices used in their vehicles.

Thus, the systems known to date in particular are unable to maintain a good enough seal during endurance testing which may include more than 150,000 operating cycles at temperatures which can range between −35° C. and +150° C.

The present invention aims to provide a connection device, and a method of making a connection device which meet the practical requirements better than those known before, especially in that the invention allows simple, quick and repetitive manufacture with great flexibility for adaptation, and in that it guarantees optimum crushing of the pipe made of flexible material without it being damaged, and does so while at the same time allowing the desired result, namely better leaktightness of the connection device, to be obtained, all this being achieved with excellent ability to withstand vibration, for an optimized cost.

To this end, the present invention provides, in particular, a device forming a leaktight connection between a rigid tube end-piece and the end of a flexible pipe, by crimping a part in the form of a metal sleeve onto the said end, the rigid tube end-piece comprising a terminal part comprising a shoulder of larger diameter than the tube, the said device including a rigid insert hollowed out from end to end by a bore, the said insert comprising, on the one side, a tubular part forcibly inserted into the end of the pipe facing the crimped portion of the part in the form of a metal sleeve, and, on the other side, a part equipped with an external collar of complementary shape, and in abutment with the shoulder, the said collar being extended, on the other side from the said tubular part with respect to the collar, by a tubular end-piece, characterized in that the bore in the insert is cylindrical and in that the end-piece is forcibly inserted over a determined length into a non-deformed part of the end-piece of the rigid tube and comprises seal-type sealing means.

Advantageously, the determined length is greater than about 1 cm, for example 2 cm, or is between ¼ and ¹⁄₁₀ of the length of the tubular part inserted into the pipe, preferably between ⅕ and ⅛, for example about ⅙.

In advantageous embodiments, recourse is also had to one and/or other of the following arrangements:

the part in the form of a sleeve consists of the end part of the tube;

the part in the form of a sleeve consists of an attached end sleeve tube fixed non-removably to the rigid tube end-piece;

the sleeve tube is fixed to the tube by being trapped between two folds of the wall of the tube;

the sleeve tube is fixed to the tube by being trapped between a fold of the wall of the tube and a widened part of the end part, the internal wall of which forms the shoulder;

the pipe is made of composite material with a rigid tubular core;

the tubular part of the insert forcibly inserted into the end of the pipe includes seal-type sealing means;

the seal-type sealing means comprise special seals obtained by overmolding with adherence to the insert;

the seal-type sealing means comprise at least one annular groove fitted with an O-ring seal;

the tube is made of aluminum alloy and the insert is made of steel.

the external wall of the tubular part of the insert forcibly inserted into the end of the pipe comprises a number of flutes or annular grooves so that the adherence between the pipe and the external crimping is improved.

The invention also relates to a method for making a device of the type described above.

More specifically, it also relates to a method for making a device providing a leaktight connection between a rigid tube end-piece and the end of a flexible pipe by crimping a part in the form of a metal sleeve onto the said end, characterized in that:

after a shoulder has been formed on the terminal part of the rigid tube end-piece, for example by widening the said end-piece, an end-piece of determined length, fitted with a seal, with an insert hollowed out from end to end by a cylindrical bore, the said insert being equipped with an external collar, is forcibly introduced into a nondeformed part of the end-piece beyond the shoulder until it comes into abutment with the shoulder the other tubular end of the insert is forcibly introduced into the end of the pipe, and the part in the form of a metal sleeve integral with the tube end-piece is crimped onto the pipe.

The present invention will be better understood from reading the description which follows of a number of specific embodiments given by way of non limiting examples.

It refers to the accompanying drawings in which.

In the remainder of the description, and if there are grounds for this, the same reference numerals will be used to denote the same elements.

Figure 1:
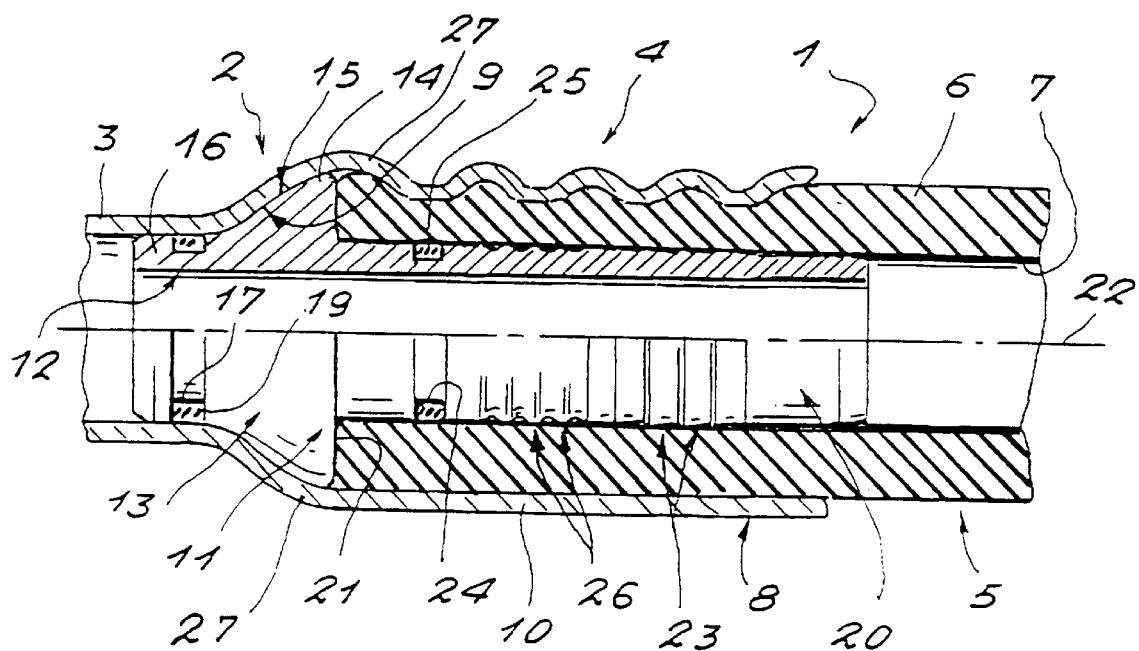
FIG. 1 is a view as two longitudinal half-sections showing respectively, before and after crimping, a first embodiment of the device according to the invention.

FIG. 1 shows a device 1 providing a leaktight connection between an end-piece 2 of a rigid tube 3, for example made of aluminum, and the end 4 of a flexible pipe 5 made of composite material.

The pipe 5 consists of a cylindrical outer casing made of elastomer 6, for example of rubber, and of a cylindrical core 7 made of a rigid material, such as a plastic, for example, known by the name NYLON.

However, in other specific embodiments, the pipe does not have a rigid core and/or has an intermediate cylindrical braiding.

The end-piece 2 is widened at its terminal part 8 so as to form with its internal face a shoulder 9 of frustoconical shape, between the nominal inside diameter of the tube and going out to a diameter of between 1.1 and 2.5 times the inside diameter, for example between 1.5 and twice the nominal inside diameter of the tube.

The widening is obtained, for example, by the passage of a number of punches, for example three passes or successive steps.

The vertex half-angle of the frustoconical part is, for example, between about 20° and about 40°, for example about 30°, as depicted in FIG. 1.

In the embodiment of the invention which is more specifically described here, this widening is performed over a length of end-piece of between 20 mm and 60 mm, for example over 40 mm, to form a part 10 in the form of a sleeve.

The device 1 also includes a rigid insert 11 made of steel or reinforced polymer, hollowed out from end to end by a cylindrical bore 12. The insert comprises, on one side, a part 13 which has a collar 14, the upper outer face 15 of which is of a shape which complements and is in abutment with the shoulder 9.

The insert also includes, aligned with and forcibly inserted, for example during the third above-described pass, into the non-deformed part of the tube 3 of determined inside diameter, starting from the collar 14, a tubular end-piece 16 integral or of one piece with the said collar and the rest of the insert, for example about 5 mm of length, comprising an annular peripheral groove 17 equipped with an O-ring seal 19.

The forcible insertion takes place with an interference fit of between 0.1 mm and 0.2 mm across the diameter.

An assembly of this kind makes it possible to obtain better sealing, despite the anticipated seizure and the risks of the seal becoming jammed.

The diameter of the tubular end-piece 16 is moreover more or less equal to or slightly greater, for example by 1 mm or 2 mm, than the outside diameter of the tubular part 20.

On the other side, the insert comprises a tubular part 20 forcibly inserted into the end 4 of the pipe 5 until it comes into abutment on the face 21 of the collar 14, which for example is perpendicular to the axis 22 of the device.

The part 20 comprises a number of grooves, for example five grooves 23 shaped like a Christmas tree to facilitate the adherence of the pipe, an annular groove 24 fitted with an O-ring seal 25 and/or special HNBR, butyl or equivalent seals, obtained directly by overmolding with adherence on the steel support consisting of the external wall of the insert and/or several round grooves 26.

The insert is machined for example either by turning or by rolling starting from tubes before it is fitted with sealing systems using O-rings or special seals as has just been described.

The configuration adopted gives the device great flexibility for adaptation.

Indeed, the shape of the steel insert can be worked differently depending on the pipe to be connected, for example with Christmas tree grooves, round grooves, square-sided grooves, etc.

It allows a use without an O-ring or with just one seal or alternatively a number of seals, without the general method of manufacture changing.

The elastomer material of the seals can be adapted to suit the nature of products conveyed.

Finally, the device according to the invention can be scaled up or down, here too, simply and adaptably, to all the known standard sizes (in millimeters): 5/16, 13/32, 1/2, 5/8, 3/4 starting from standard commercial tubes of diameters: 9.52; 12.7; 15.88; 19.05 or for tubes with metric diameters: 10, 13, 16, 20 mm.

Finally, the part 10 in the form of a sleeve is crimped onto the end 4 of the flexible pipe 5, forming for example three or four crimped teeth.

The mechanical resistance of the pipe and of the insert to have been pulled out longitudinally under a mechanical tensile force which may or may not be due to the pressure, is also provided by this crimping, thanks in particular to the tooth 27 which restrains the insert the collar 14 of which is immobilized at the other end by the shoulder 9.

The grooves 23 for their part improve the adherence of the pipe with respect to the external crimping.

Figure 2:
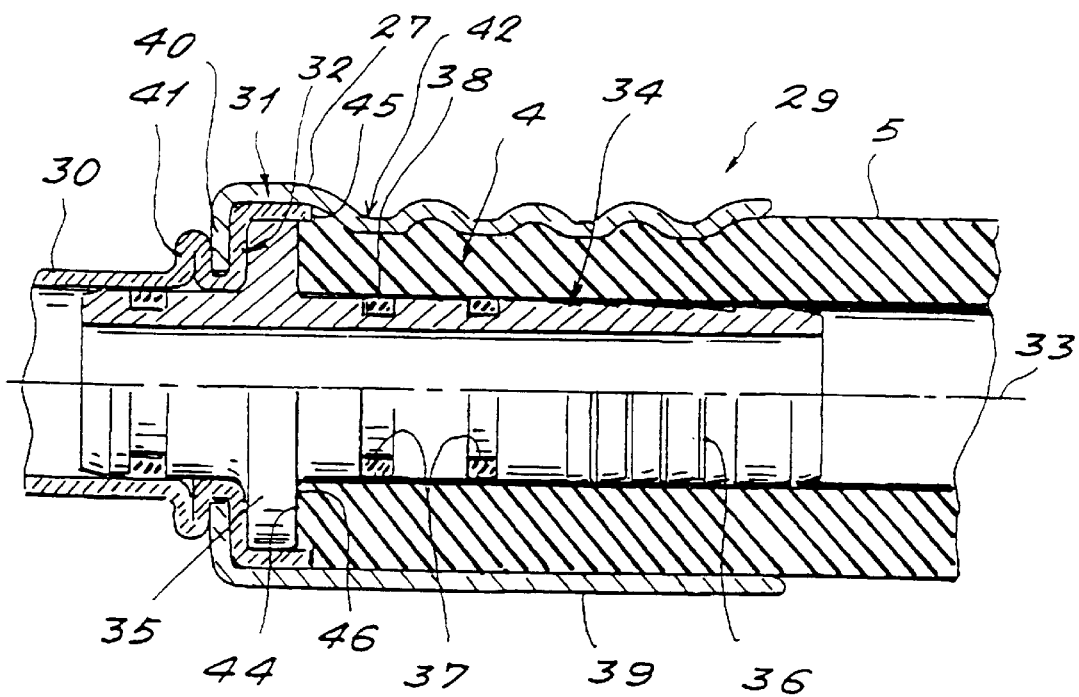
FIG. 2 is a view as two longitudinal half-sections showing respectively, before and after crimping, a second embodiment according to the invention, comprising an attached crimping sleeve.

FIG. 2 shows a connection device 29 according to another embodiment of the invention, between a tube 30 comprising a widened terminal part 31, which is for example cylindrical, and the end 4 of the pipe 5.

The part 31 is equipped on one side with a face 32 perpendicular to the axis 33 of the device and situated in the radial plane thereof forming an internal shoulder.

On the other side it is entirely open so that it forms a cup or radial ring around the bore 28 of the tube, equipped with a cylindrical peripheral edge of axis 33.

The device 29 comprises a steel insert 34 fitted with an end-piece with groove and O-ring seal of the type described with reference to FIG. 1, forcibly inserted into the tube downstream of the terminal part, the collar 35 for example of cylindrical annular shape being in abutment against the face 32 of the widened part.

For its part, the tubular part 36 of the insert is forcibly inserted into the pipe and comprises, in addition to the Christmas tree grooves, two annular grooves 37 with O-rings 38.

The device 29 comprises a metal sleeve tube 39, for example made of aluminum, in the shape of a cylindrical bell terminating on one side in an end wall 40 pierced with a circular orifice centered about the axis 33 of the device and with an inside diameter which more or less corresponds to the outside diameter of the tube 30 to which it is attached, for example by trapping the wall 40 between a fold 41 of the wall of the said tube on one side, and by the wall situated in the radial plane of the widened part on the other side.

The sleeve tube 39 is then crimped onto the pipe with the force needed to obtain a good seal, either with compression of about 30 to 55% by volume of the pipe, for example greater than 40%, for example about 45%, bearing in mind that there is a backpressure applied to the inside of the pipe by the insert.

The indented part 42 of the crimping also longitudinally holds the insert in position due to the fact that the face 44 of the end of the pipe, which also bears on the peripheral edge 45 of the widened part, abuts against the external face 46 of the collar.

Figure 3:
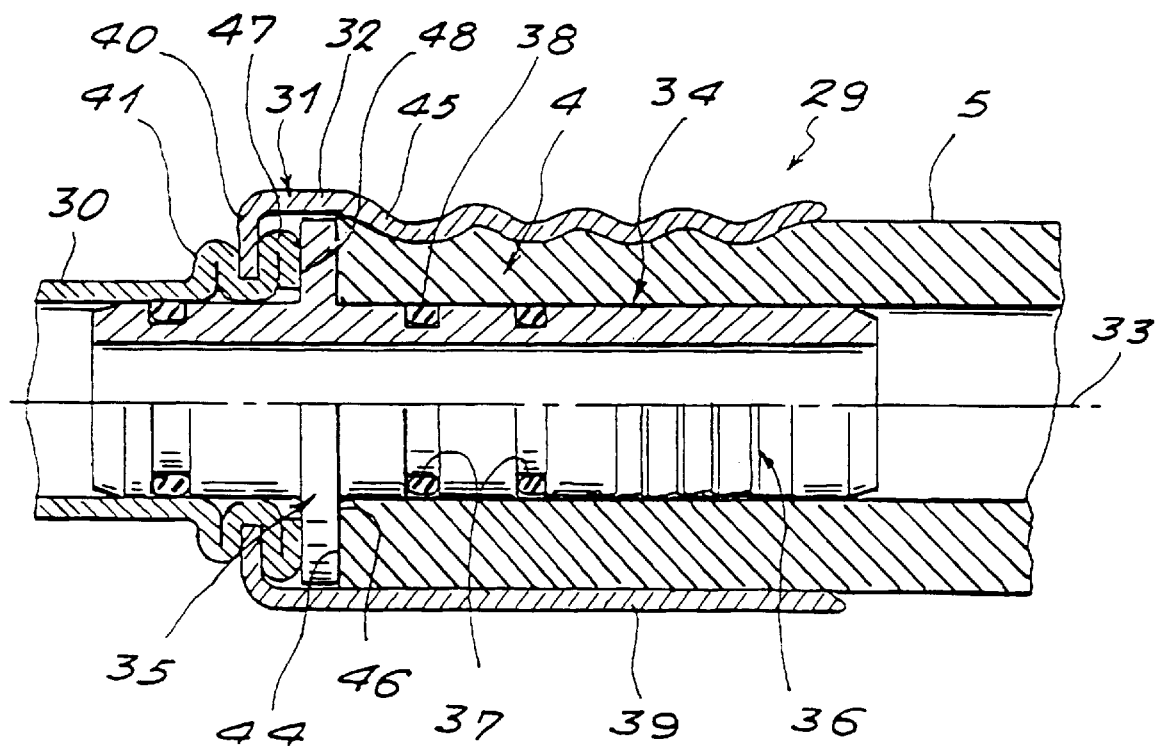
FIG. 3 is a view of two longitudinal half-sections showing respectively, before and after crimping, an alternative form of the embodiment of the invention depicted in FIG. 2.

FIG. 3 depicts another embodiment of the attachment of the sleeve tube 39 to the tube 30, by trapping the wall 40 between two folds 41 and 47 of the wall of the tube, the external face 48 of the second fold 47 then constituting the shoulder against which the collar 35 abuts.

The method of making the device 1 is now going to be described briefly with reference to FIG. 1.

First of all, the terminal part of the tube end-piece is widened, and the insert is forcibly introduced into the tube, the insert having previously been prepared with its seals, the pipe is forcibly introduced over the tube, and crimped.

As goes without saying, and as is in any case clear from the foregoing, the invention is not restricted to the embodiments more specifically described.

On the contrary, it encompasses all alternative forms thereof, especially those in which the insert is made of a rigid and/or reinforced molded plastic, those in which the tube is made of steel or of some metal other than aluminum or an aluminum alloy, those in which the flexible pipe is, for example, reinforced by reinforcing members and/or comprises a protective outer casing, those in which the insert is secured to the tube by gluing also, and those in which the insert tubular part introduced into the pipe extends more or less beyond the crimped part.

We claim:

1. A device for forming a leaktight connection between a rigid tube end-piece and one end of a flexible pipe comprising:

a crimping part comprising a metal sleeve secured onto said one end of said flexible pipe;

a terminal part formed in said rigid tube end-piece comprising shoulder means have a larger diameter than the diameter of the rigid tube end piece; and a rigid insert hollowed out from end to end by a cylindrical bore, said rigid insert having:

a first side comprising a tubular part forcibly inserted into said one end of the flexible pipe facing said crimping part, and a second side comprising a part equipped with an external collar having a complementary shape to said shoulder means, and in abutment with said shoulder means, said collar being extended in a direction opposite the tubular part with respect to the collar by a tubular end-piece forcibly inserted over a determined length into a part of the rigid tube end-piece and including seal-type sealing means.

2. The device according to claim 1, wherein the shoulder means is frustoconical with a vertex half-angle of between 20° and 40°.

3. The device according to claim 1, wherein the determined length is between ¼ and ⅛ of the length of the tubular part.

4. The device according to claim 1, wherein the crimping part comprises the terminal part of the rigid tube end-piece.

5. The device according to claim 1, wherein the crimping part comprises an attached end sleeve tube secured to the rigid tube end-piece.

6. The device according to claim 5, wherein said end sleeve tube is fixed to the rigid tube by inserting said end sleeve tube between two folds of a wall of the rigid tube end-piece, the shoulder means being formed by an external face of the second fold.

7. The device according to claim 5, wherein the sleeve tube is fixed to the rigid tube end-piece by inserting said sleeve tube between a fold of a wall of the rigid tube end-piece and a widened part of the terminal part of the rigid end-piece, the internal wall of the widened part forming the shoulder means.

8. Device according to claim 1, wherein the flexible pipe comprises a composite material having a rigid tubular core.

9. Device according to claim 1, wherein the tubular part of the rigid insert, forcibly inserted into the end of the flexible pipe, includes seal-type sealing means.

10. Device according to claim 1, wherein the rigid tube comprises aluminum alloy and the insert comprises steel.

11. Device according to claim 1, wherein an external wall of the tubular part of the rigid insert, forcibly inserted into the one end of the flexible pipe, comprises a number of grooves to improve adherence between the flexible pipe and the insert.

12. A method of making a device for providing a leaktight connection between a rigid tube end-piece and one end of a flexible pipe, comprising:

forming a metal sleeve having shoulder means on a terminal part of the rigid tube end-piece;

forcibly introducing an end-piece of determined length, fitted with a seal, of a rigid insert hollowed out from end to end by a cylindrical bore, the insert having an external collar, into a part of the rigid tube end-piece situated beyond the shoulder means, until said external collar comes into abutment with said shoulder means;

introducing forcibly an opposite end of the rigid insert into the end of the flexible pipe; and crimping the metal sleeve, onto the flexible pipe.

* * * * *